US009568920B2

(12) United States Patent
Bloss et al.

(10) Patent No.: US 9,568,920 B2
(45) Date of Patent: Feb. 14, 2017

(54) AUTOMATIC MITIGATION OF VEHICLE WIND BUFFETING

(71) Applicant: GM GLOBAL TECHNOLOGY OPERATIONS LLC, Detroit, MI (US)

(72) Inventors: Brandon C. Bloss, Brighton, MI (US); Christopher L. Fulton, Fenton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 100 days.

(21) Appl. No.: 14/614,022

(22) Filed: Feb. 4, 2015

(65) Prior Publication Data

US 2016/0221420 A1 Aug. 4, 2016

(51) Int. Cl.
  *G05D 3/10* (2006.01)
  *E05F 15/71* (2015.01)
  *B60J 1/17* (2006.01)

(52) U.S. Cl.
  CPC ...................................... *G05D 3/10* (2013.01)

(58) Field of Classification Search
  CPC ............... B60J 1/20; B60J 7/0573; B60J 1/17; G10K 11/178; E05F 15/695; E05F 15/71; B60Q 1/00; B60H 1/249; B60R 13/0815; B60R 1/078; G05D 3/10
  USPC ........ 701/1, 49; 318/282, 283, 62; 381/71.4; 454/105, 165; 296/180.1
  See application file for complete search history.

(56) References Cited

U.S. PATENT DOCUMENTS

| 4,835,449 | A  | * | 5/1989  | Huehn     | B60J 7/0573 |
|           |    |   |         |           | 296/223     |
| 6,712,413 | B1 |   | 3/2004  | Flowerday |             |
| 7,530,625 | B2 |   | 5/2009  | Gulker et al. |         |
| 2007/0159120 | A1 | * | 7/2007 | Zhu       | B60R 1/078  |
|           |    |   |         |           | 318/62      |
| 2008/0113600 | A1 | * | 5/2008 | Kim       | B60R 13/0815 |
|           |    |   |         |           | 454/105     |
| 2008/0306661 | A1 | * | 12/2008 | Campbell | B60J 1/20   |
|           |    |   |         |           | 701/49      |
| 2009/0069984 | A1 | * | 3/2009 | Turner    | E05F 15/71  |
|           |    |   |         |           | 701/49      |
| 2009/0121517 | A1 | * | 5/2009 | Gulker    | B60J 1/17   |
|           |    |   |         |           | 296/180.1   |
| 2013/0054096 | A1 |   | 2/2013  | Han et al. |            |
| 2013/0309956 | A1 | * | 11/2013 | Mouch    | B60H 1/249  |
|           |    |   |         |           | 454/165     |

(Continued)

*Primary Examiner* — Yuri Kan
(74) *Attorney, Agent, or Firm* — Quinn Law Group, PLLC

(57) ABSTRACT

A vehicle includes a body defining a vehicle interior, doors attached to the body and providing access to the vehicle interior, windows, sensors, and a controller. The windows are disposed in a respective one of the doors, and each includes a window actuator. The sensors include a speed sensor operable for determining a speed of the vehicle and position sensors each operable for detecting a position of a respective one of the windows. The controller programmed to execute a method by receiving input signals from the set of sensors, including the speed of the vehicle and the detected position from each of the position sensors, and transmitting a control signal to at least one of the window actuators to cause one of the windows to move to a predetermined partially-opened position above a calibrated threshold vehicle speed. This action automatically mitigates effects of wind buffeting in the vehicle interior.

14 Claims, 2 Drawing Sheets

(56) References Cited

U.S. PATENT DOCUMENTS

| | | | | |
|---|---|---|---|---|
| 2014/0309806 A1* | 10/2014 | Ricci | ............... | B60Q 1/00 |
| | | | | 701/1 |
| 2015/0048764 A1* | 2/2015 | Binfet | ............... | E05F 15/695 |
| | | | | 318/283 |
| 2015/0358727 A1* | 12/2015 | Rizzo | ............... | G10K 11/178 |
| | | | | 381/71.4 |

* cited by examiner

US 9,568,920 B2

AUTOMATIC MITIGATION OF VEHICLE WIND BUFFETING

TECHNICAL FIELD

The present disclosure relates to a system and method for automatically mitigating the effects of wind buffeting in a vehicle.

BACKGROUND

Air resistance produces drag forces on an automotive vehicle body. The drag forces become more pronounced at higher vehicle speeds. Automotive vehicle bodies and externally-attached components such as side mirrors are therefore typically designed with an aerodynamic shape to help maximize fuel economy and provide a desired level of vehicle acceleration and handling. However, regardless of how aerodynamic the design might be, the smooth laminar airflow passing over and around a moving vehicle body is disrupted when the front or rear windows of the vehicle are opened. The disrupted airflow may be perceived by an occupant of a vehicle interior as pulsations of air pressure, i.e., wind buffeting.

SUMMARY

A controller-based solution is disclosed herein for the problem of wind buffeting in automotive vehicles. Conventional solutions to this problem include the use of specially designed side mirrors, high-drag aero deflectors at mirror-to-window interfaces, and pressure relief vents, all of which require additional hardware and/or vehicle styling changes. The present approach foregoes such hardware-based design solutions in favor of automatic control of the opened/closed positions of one or more windows of the vehicle in response to threshold vehicle speed conditions and detected window position data.

In an example embodiment as described herein, a vehicle includes a body defining a vehicle interior, doors attached to the body, windows, window actuators, a set of sensors, and a controller. Each window is movably disposed in a respective one of the doors. Each window actuator, such as a motor or a linear actuator, that translates the window anywhere between and inclusive of a fully-opened and a fully-closed position. The sensors include a speed sensor operable for determining a speed of the vehicle and position sensors each operable for detecting an opened/closed position of a respective one of the windows.

The controller is programmed to automatically mitigate effects of wind buffeting in the vehicle interior under certain threshold conditions. The controller accomplishes this desired control result by receiving and processing input signals from the sensors, including the speed of the vehicle and the detected position from each of the position sensors. When a window is opened while the vehicle is moving above a calibrated threshold vehicle speed, the controller transmits a control signal to a window actuator of another window, i.e., a "controlled window", to cause the controlled window to move to a predetermined partially-opened position. In an example embodiment, the predetermined partially-opened position is about 30-50 mm of travel from a fully-closed position. In this manner, undesirable pressure pulsations in the vehicle interior due to wind buffeting are reduced to enhance overall ride comfort.

A corresponding method is disclosed for automatically mitigating effects of wind buffeting in the vehicle interior. The method includes receiving, via a controller, input signals from a set of sensors, including a speed of the vehicle and detected positions of the windows. The method also includes transmitting a control signal via the controller, when the detected speed is above a calibrated threshold vehicle speed and one of the windows is open a calibrated amount, to a window actuator of a predetermined one of the windows. The control signal commands and thus causes the predetermined window to move to a calibrated partially-opened position, which in turn automatically mitigates the effects of wind buffeting.

The above features and advantages and other features and advantages of the present disclosure are readily apparent from the following detailed description when taken in connection with the accompanying drawings.

DETAILED DESCRIPTION

Figure 1:
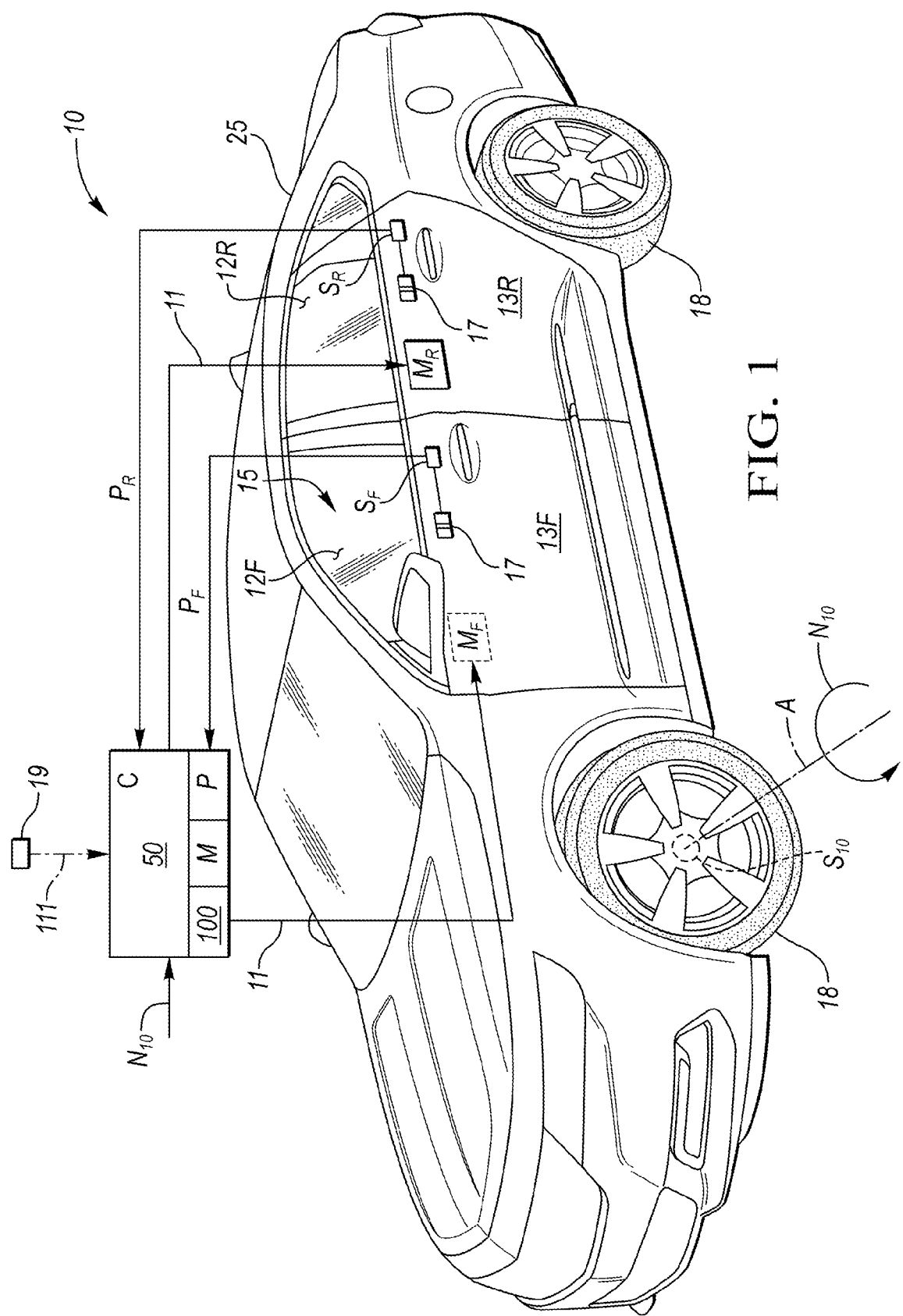
FIG. 1 is a schematic illustration of an example vehicle having a controller programmed to automatically mitigate pressure pulsation effects of wind buffeting.

Referring to the drawings, wherein like reference numbers correspond to like or similar components throughout the several figures, an example vehicle 10 is shown schematically in FIG. 1. The vehicle 10 includes a body 25 defining a vehicle interior 15. The vehicle 10 also includes a plurality of doors 13F and 13R, with only one door 13F and 13R visible from the perspective of FIG. 1. Each door 13F, 13R is hinged or otherwise attached to the body 25 to provide access to the vehicle interior 15. The doors 13F provide access to front seats (not shown) of the vehicle 10, i.e., a driver seat and a front passenger seat, while the doors 13R provide access to one or more rear rows of seats. Therefore, the letters "F" and "R" as used herein designate conventional front and rear positions with respect to a normal forward driving position, respectively. The vehicle 10 may be configured as a 4-door passenger sedan as shown, a sport utility vehicle, a pickup truck, or any other vehicle having multiple rows of seats and thus doors 13R positioned to the rear of the doors 13F.

The vehicle 10 of FIG. 1 also includes a plurality of windows 12F and 12R and a corresponding plurality of window actuators, for instance example window motors $M_F$ and $M_R$. Each window 12F, 12R is disposed in a respective one of the doors 13F and 13R. The windows 12F and 12R are embodied as moveable panes of glass, and therefore the window actuators $M_F$ and $M_R$ are configured to translate, i.e., linearly open and close, a respective one of the windows 12F, 12R with respect to a corresponding door 13F, 13R anywhere between and inclusive of a fully-opened and a fully-closed position as is well known in the art.

To request a desired window position, each of the doors 13F, 13R may include a window toggle switch 17 such as a lever or tab positioned on an interior surface of the doors 13F, 13R. Each window toggle switch 17 is in electrical communication with a controller (C) 50, which in turn is in electrical communication with a respective window actuator MF or MR, such that movement of the window toggle switch 17 requests the energizing of a respective window actuator $M_F$ or $M_R$ in a particular direction. That is, when a passenger of the vehicle 10 moves the window toggle switch 17 for a given window 12F or 12R in a first or a second direction, the window actuator $M_F$ or $M_R$ for that particular window 12F or 12R is commanded, via the controller 50, to move the window 12F or 12R toward a respective fully-opened or fully-closed position.

The controller 50 may be embodied as one or more computer devices or control modules as explained below, at least one of which is specially programmed to mitigate pressure pulsation effects of wind buffeting in the vehicle interior 15, doing so via automatic control of the positions of the windows 12F and 12R. Therefore, each of the window actuators $M_F$, $M_R$ is also responsive to control signals (arrow 11) from the controller 50 independently of any direct control of the window actuators $M_F$, $M_R$ afforded via manual operation of the window toggle switches 17. Generation and transmission of the control signals (arrow 11) is performed according to instructions embodying various steps of a method 100, an example of which is described below with reference to FIG. 2.

The controller 50 may be configured as a body control module (BCM) in a possible embodiment, or any other suitably configured control device(s) having memory (M) and a processor (P), as well as circuitry including but not limited to a timer, oscillator, analog-to-digital (A/D) circuitry, digital-to-analog (D/A) circuitry, a digital signal processor, and any necessary input/output (I/O) devices and other signal conditioning and/or buffer circuitry. The memory (M) may include tangible, non-transitory memory such as read only memory (ROM), e.g., magnetic, solid-state/flash, and/or optical memory, as well as sufficient amounts of random access memory (RAM), electrically-erasable programmable read-only memory (EEPROM), and the like. Code embodying the steps of the method 100 may be programmed and recorded in the memory (M) and executed by the processor (P) in the overall control of the vehicle 10.

The controller 50 is in communication with a set of sensors, including at least a vehicle speed sensor $S_{10}$ and window position sensors $S_F$, $S_R$. The vehicle speed sensor $S_{10}$ is configured to measure a vehicle speed (arrow $N_{10}$), i.e., a value indicative of the speed of the vehicle 10 with respect to a surface on which the vehicle 10 travels. In one possible embodiment, the vehicle speed sensor $S_{10}$ may be embodied as a wheel speed sensor positioned with respect to a corresponding road wheel 18 of the vehicle 10. In such an embodiment, the vehicle speed sensor $S_{10}$ measures a rotational speed of the wheel 18 as the wheel 18 rotates about an axis of rotation A, with this measured wheel speed being used by the controller as the vehicle speed (arrow $N_{10}$). Each wheel 18 may have a respective vehicle speed sensor $S_{10}$, or just one of the wheels 18 may be so configured. In an alternative embodiment, the speed of the vehicle 10 may be measured via a transmission output speed sensor as is known in the art, which is operable to measure a rotational speed of an output member of a transmission (not shown), with the output speed used as the vehicle speed (arrow $N_{10}$) within the scope of the method 100.

The controller 50 of FIG. 1 also receives a respective position signal (arrows $P_F$ and $P_R$) describing an opened/closed position each of the windows 12F and 12R. The position of a given window 12F or 12R may be measured by the window position sensors $S_F$, $S_R$ as a position of the window actuator $M_F$ or $M_R$, or of a position of the window 12F or 12R itself within its allowable range of motion. Some vehicle designs permit a rear window 12R to be only partially-opened. In such a case, the allowable range of motion defines the fully-opened position by its allowed range of motion limit as opposed to an absolute fully-opened position.

When the vehicle 10 is traveling above a calibrated or predetermined threshold vehicle speed and an occupant of the vehicle interior 15 opens a front or rear window 12F or 12R, respectively, the controller 50 transmits the control signal (arrow 11) to an opposite one of the window actuators MF or MR to cause a respective one of the windows 12F or 12R, hereinafter also referred to as a "controlled" window, to move to a predetermined partially-opened position. The identity of the controlled window 12F or 12R depends on the identity of the window 12F or 12R that was originally opened by an occupant of the vehicle interior 15, i.e., the "non-controlled" window, with the logic and timing of the control operation being encoded in memory (M) of the controller 50 and executed by the processor (P) while the vehicle 10 is moving.

Optionally, an input device 19 may be used to override the buffeting mitigation functionality of the controller 50 via an override signal (arrow 111). Under some conditions, a passenger of the vehicle 10 may not wish to have a window 12F or 12R opened while the vehicle 10 is moving. In various embodiments, the input device 19 may be a key fob, an internal button, an icon on a touch screen, or a sensor, e.g., a moisture sensor operable for detecting rain or snow. The latter option may be desirable during inclement weather or whenever automatic control according to method 100 is otherwise not desired.

Figure 2:
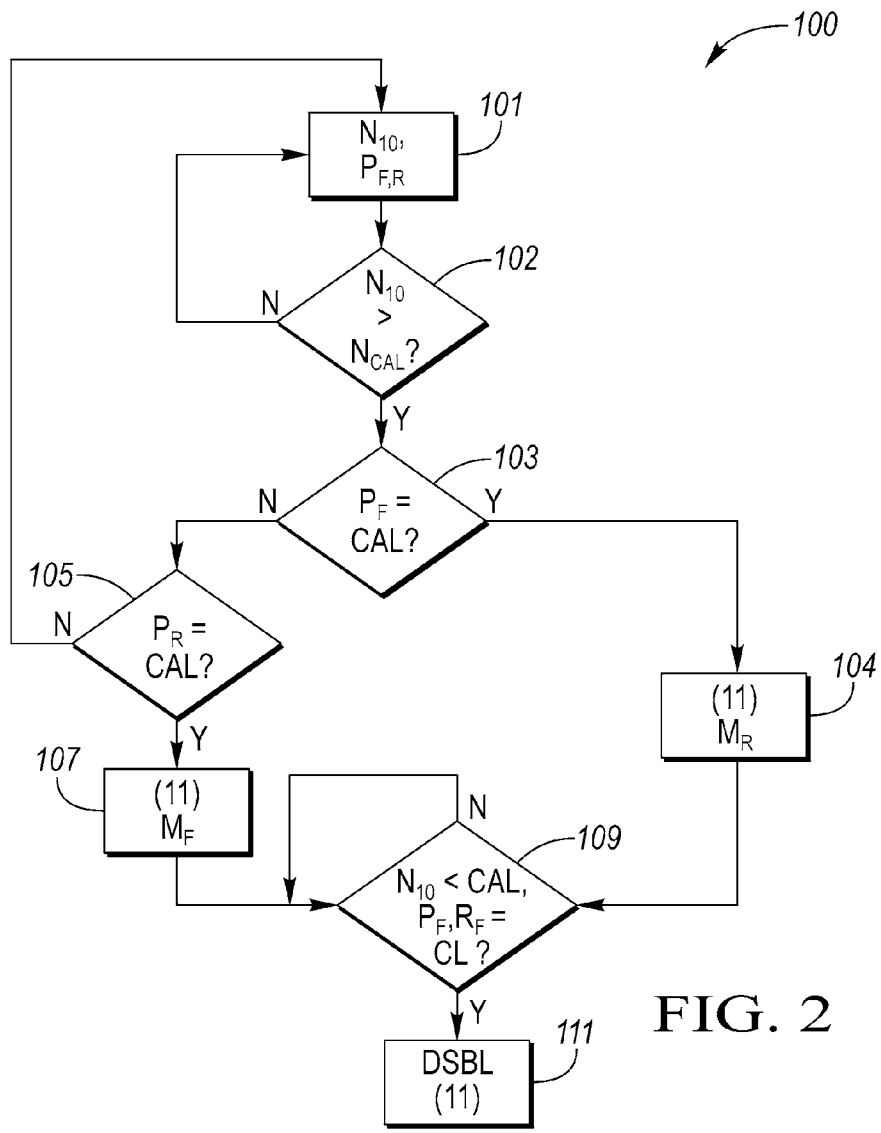
FIG. 2 is a flow chart describing a method for mitigating pressure pulsation effects of wind buffeting in the example vehicle shown in FIG. 1.

Referring to FIG. 2, an example embodiment of the method 100 noted above begins at step 101 wherein the controller 50 of FIG. 1 receives various input signals from the set of sensors ($S_{10}$, $S_F$, $S_R$). Step 101 includes determining or receiving the vehicle speed (arrow $N_{10}$) and the detected positions ($P_F$, $P_R$) from each of the position sensors ($S_F$, $S_R$), with the positions PF, PR abbreviated as $P_{F,R}$ in FIG. 2. The method 100 proceeds to step 102 once these values have been received.

Step 102 entails comparing the received vehicle speed (arrow $N_{10}$) to a calibrated threshold vehicle speed ($N_{CAL}$) to determine if wind buffeting mitigation control is required. The calibrated vehicle speed ($N_{CAL}$) may be determined based on the particular aerodynamic qualities of the vehicle 10, including the design of its body 25 (see FIG. 1). Problematic wind buffeting effects may occur at different speeds for different vehicle designs. For instance, pressure pulsations may occur at a lower speed for sport utility vehicles than for certain streamlined 4-door sport sedans. In a non-limiting illustrative example embodiment, a calibrated vehicle speed ($N_{CAL}$) of above 30 MPH, e.g., 30-40 MPH, may be used. The method 100 therefore proceeds to step 103 only when the vehicle 10 exceeds the calibrated vehicle speed ($N_{CAL}$).

At step 103, the controller 50 determines whether one of the front windows 12F is presently open. Step 103 may entail comparing the position signals ($P_F$) for each window 12F to a calibrated position, abbreviated $P_F$=CAL in FIG. 2, to determine if a sufficient amount of travel of the window 12F has occurred in order to be considered "open" for the purposes of the method 100. Buffeting may not be perceptible at very slight levels of travel, such as a few millimeters (mm), and so the method 100 may continue only when the window 12F is open at least a calibrated amount of travel, e.g., 5 to 10 mm or more.

The method 100 proceeds to step 104 when the position signals ($P_F$) correspond to a position that exceeds the calibrated position or when the controller 50 otherwise determines that the window 12F is sufficiently open. The method 100 proceeds instead to step 105 when the position signals ($P_F$) correspond to a position that does not exceed the calibrated position or when the controller 50 otherwise determines that the window 12F remains closed.

At step 104, the controller 50 transmits a control signal (arrow 11) to the window actuator ($M_R$) of at least one of the rear windows 12R to command movement of the window(s) 12R to a predetermined open position. For instance, the controller 50 may command the window motor for one or both of the windows 12R to open or lower the window anywhere in a range of at least 30 mm, or in the range of 30 mm to 40 mm, or by 40 mm in various embodiments. Step 104 may occur immediately upon completion of step 103, or the controller 50 may wait through a calibrated interval or duration before proceeding with step 104, such as 2-3 seconds, to determine if the opening of the non-controlled window is a transient event.

The controller 50 may optionally include a lookup table that indexes the amount of travel of the window 12R to a particular vehicle speed, again with the specific control parameters depending on the design and the desired mitigation effects. In such an embodiment, the controller 50 may be programmed to extract a value describing the amount of travel required for the window 12R for a given vehicle speed ($N_{10}$) as measured by the sensor $S_{10}$ of FIG. 1. The method 100 proceeds to step 109 after lowering the window 12R to the predetermined open position.

At step 105, the controller 50 determines whether one of the rear windows 12R is open. Step 105 may entail comparing the position signals ($P_R$) for the window(s) 12R to a calibrated position, abbreviated $P_R$=CAL in FIG. 2, to determine if a sufficient amount of travel of the window 12R has occurred to be considered "open" for the purposes of the method 100. As with step 103, this distance or amount of travel may be about 5 mm to 10 mm in a possible embodiment. The method 100 proceeds to step 107 when the position signals ($P_R$) correspond to a position that exceeds the calibrated position or when the controller 50 otherwise determines that the window 12R is sufficiently open. The method 100 proceeds instead to step 101 when the position signals ($P_R$) correspond to a position that does not exceed the calibrated position or when the controller 50 otherwise determines that the window 12R is still closed.

Step 107 entails transmitting a control signal (arrow 11) to the window actuator ($M_F$) of at least one of the windows 12F to command movement of the window(s) 12F to a predetermined open position. For instance, as with step 104 described above, the controller 50 may command the window actuator $M_F$ for one or both of the windows 12F to open or lower the window anywhere in a range of 30 mm-50 mm, or by 40 mm in another embodiment. The controller 50 may have a lookup table that indexes the amount of travel of the window 12F to a particular vehicle speed as with step 104. The method 100 proceeds to step 109 after lowering the window 12F to the predetermined open position.

Step 109 includes determining a set of conditions necessary for terminating active buffeting control via the controller 50. For example, active buffeting control may cease once the vehicle speed ($N_{10}$) slows below the calibrated threshold speed ($N_{CAL}$) for a predetermined duration, such as 10 seconds. The controller 50 may also determine if the windows 12F and/or 12R has closed, as abbreviated $P_F$, $R_F$=CL in FIG. 2. If the driver closes the front window 12F, for instance, the controller 50 can transmit the control signal (arrow 11) to the affected window actuator MF or MR to control the respective window 12F or 12R back to a fully-closed position. In an example control situation, a passenger may lower the rear window 12R while the vehicle 10 of FIG. 1 is traveling above the calibrated threshold vehicle speed, $N_{CAL}$, with resultant wind buffeting. The controller 50 automatically lowers one or more of the front windows 12F by the calibrated amount in response to such a set of conditions. The method 100 proceeds to optional step 111 when step 109 is complete.

An optional control action at step S111 is the automatically disabling of mitigation functionality of the controller 50. As noted above, the device 19 of FIG. 1 may be used for this purpose, such as during inclement weather by sensing rain/snow. Such an option may be desirable to prevent rain or snow from entering the vehicle interior 15. Other control actions could include providing an override function in which an operator of the vehicle 10 can affirmatively disable mitigation, for instance via a button or a touch icon located in the vehicle interior 15 of FIG. 1, and/or executing control of a closing window 12F or 12R when an obstacle is in the path of the window 12F or 12R, such as by commanding motion of the affected window 12F or 12R in an open direction so as to avoid the obstacle.

Figure 3:
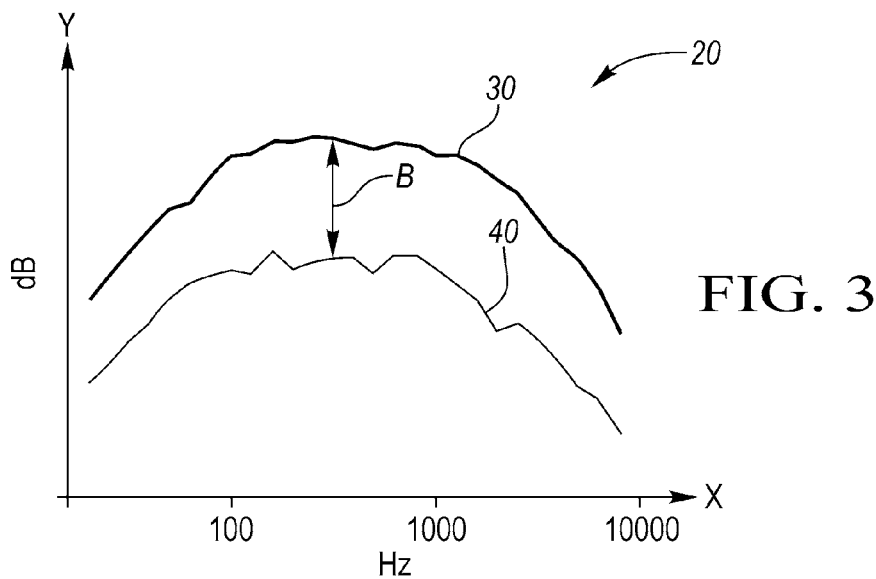
FIG. 3 is a schematic depiction of the effect of execution of the present method on wind noise in a moving vehicle, with wind noise frequency plotted on the x-axis and sound pressure level plotted on the y-axis.

Referring to FIG. 3, a plot 20 of wind noise frequency (Hz) on the X-axis and sound pressure level (dB) on the Y-axis depicts possible wind buffeting mitigating effects of the method 100 when used aboard the example vehicle 10 of FIG. 1. Trace 30 represents the wind buffeting level in an example situation with the rear windows 12R closed and one of the front windows 12F opened. Upon execution of the method 100, the driver-side front window 12F is lowered the calibrated amount. Arrow B indicates the decrease in wind noise due to buffeting, with trace 40 representing the new lower level of such wind noise. As buffeting can be quite severe, for instance as much as 130 dB in some designs, the 10-20% or greater reduction in wind noise from method 100 will benefit the ride comfort of passengers seated in the vehicle interior.

The present approach is intended to help mitigate the effects of either front or rear window-induced wind buffeting without altering exterior styling. The present approach utilizes existing vehicle sensors and an existing onboard controller 50, such as a body control module, specially programmed as set forth hereinabove, to command one of the rear windows 12R to lower just enough to allow air to escape from the vehicle interior 15. Once vehicle speed slows below a calibrated threshold vehicle speed or the front windows 12F are closed, the controlled window, in this instance window 12R, can be automatically closed again, thereby minimizing passenger interaction with the wind buffeting mitigation process.

While the best modes for carrying out the disclosure have been described in detail, those familiar with the art to which this disclosure relates will recognize various alternative designs and embodiments within the scope of the appended claims.

The invention claimed is:

1. A vehicle comprising:
   a body defining a vehicle interior;
   a plurality of doors attached to the body and providing access to the vehicle interior;
   a plurality of windows, including a front window and a rear window, each of which is disposed in a respective one of the doors;

a plurality of window actuators, each of which is operable for translating a respective one of the windows anywhere between and inclusive of a fully-opened and a fully-closed position;

a set of sensors, including a speed sensor operable for determining a speed of the vehicle and a plurality of window position sensors each operable for detecting a position of a respective one of the windows; and a controller programmed to receive input signals from the set of sensors, including the speed of the vehicle and the detected position from each of the window position sensors, and to transmit a control signal, above a calibrated threshold vehicle speed, to the window actuator of the rear window to cause the rear window to translate to a predetermined partially-opened position when the window position sensors detect that the front window is open, and to the window actuator of the front window to translate the front window to the predetermined partially-opened position when the position sensors detect that the rear window is open, and to thereby automatically mitigate effects of wind buffeting in the vehicle interior.

2. The vehicle of claim 1, wherein the vehicle includes a road wheel, and wherein the speed sensor is a wheel speed sensor operable to measure a rotational speed of the road wheel as the speed of the vehicle.

3. The vehicle of claim 1, wherein the predetermined partially-opened position is in the range of between 30 mm and 50 mm.

4. The vehicle of claim 1, wherein the calibrated threshold vehicle speed is greater than 30 MPH.

5. The vehicle of claim 1, wherein the controller is programmed to cause the respective window to move to the fully-closed position when the speed of the vehicle slows below the calibrated threshold vehicle speed for a calibrated duration.

6. A method for automatically mitigating effects of wind buffeting in a vehicle interior of a vehicle having windows, the method comprising:

receiving, via a controller, input signals from a set of sensors, including a speed of the vehicle from a vehicle speed sensor and detected positions of the windows from a set of window position sensors;

transmitting a control signal via the controller, when the detected speed is above a calibrated threshold vehicle speed and one of the windows is open a calibrated amount, to a window actuator of a predetermined one of the windows to thereby cause the predetermined window to move to a calibrated partially-opened position, and to thereby automatically mitigate the effects of wind buffeting; and translating the predetermined window to a fully-closed position when the speed of the vehicle slows below the calibrated threshold vehicle speed for a calibrated duration.

7. The method of claim 6, wherein the vehicle speed sensor is a wheel speed sensor operable for measuring a rotational speed of a road wheel of the vehicle, further comprising: detecting a speed of the vehicle via the wheel speed sensor.

8. The method of claim 6, further comprising: detecting the positions of the windows via a respective one of the window position sensors.

9. The method of claim 6, wherein the plurality of windows includes a front window and a rear window, and wherein transmitting the control signal includes transmitting the control signals to the window actuator of the rear window to lower the rear window when one of the window position sensors detects that the front window is open, and to the window actuator of the front window to lower the front window when another one of the window position sensors detects that the rear window is open.

10. The method of claim 6, wherein the predetermined partially-opened position is in a range of between 30 mm and 50 mm.

11. The method of claim 6, wherein the calibrated threshold vehicle speed is greater than 30 MPH.

12. A vehicle comprising:

a body defining a vehicle interior;

a road wheel;

a plurality of doors attached to the body and providing access to the vehicle interior;

a plurality of windows, each of which is disposed in a respective one of the doors, and each of which includes a window actuator, wherein the plurality of windows includes a front window and a rear window;

a plurality of window actuators, each of which is operable for translating a respective one of the windows with respect to a respective one of the doors anywhere between and inclusive of a fully-opened and a fully-closed position;

a set of sensors, including a wheel speed sensor positioned with respect to the road wheel and operable for determining a speed of the vehicle, and a plurality of window position sensors each operable for detecting a position of a respective one of the windows; and a controller programmed to receive input signals from the set of sensors, including the speed of the vehicle and the detected position from each of the position sensors, and to transmit a control signal to the window actuator of the rear window to lower the rear window by at least 30 mm when the speed of the vehicle exceeds 30 MPH and the position sensor for the front window detects that the front window is open, and to the window actuator for the front window to thereby lower the front window by a calibrated amount of travel of at least 30 mm when the position sensors detect that the rear window is open for a calibrated duration.

13. The vehicle of claim 12, wherein the controller is programmed to command the respective front and rear window to move to a fully-closed position when the speed of the vehicle slows below 30 MPH for a calibrated duration.

14. The vehicle of claim 12, wherein the controller includes a lookup table indexed by the speed of the vehicle, and is programmed to extract the calibrated amount of travel from the lookup table using the speed of the vehicle.

* * * * *